(12) United States Patent
Pihl et al.

(10) Patent No.: US 11,997,199 B2
(45) Date of Patent: May 28, 2024

(54) BIOMETRIC DEVICE WITH CRYPTOGRAPHIC CIRCUITRY

(71) Applicant: Fingerprint Cards Anacatum IP AB, Gothenburg (SE)

(72) Inventors: Dawid Pihl, Gothenburg (SE); Joachim Strömbergson, Sävedalen (SE)

(73) Assignee: FINGERPRINT CARDS ANACATUM IP AB, Gothenburg (SE)

(*) Notice: Subject to any disclaimer, the term of this patent is extended or adjusted under 35 U.S.C. 154(b) by 220 days.

(21) Appl. No.: 17/640,914

(22) PCT Filed: Sep. 4, 2020

(86) PCT No.: PCT/SE2020/050838
§ 371 (c)(1),
(2) Date: Mar. 7, 2022

(87) PCT Pub. No.: WO2021/049991
PCT Pub. Date: Mar. 18, 2021

(65) Prior Publication Data
US 2022/0337406 A1 Oct. 20, 2022

(30) Foreign Application Priority Data
Sep. 12, 2019 (SE) .................................. 1951031-2

(51) Int. Cl.
*H04L 9/08* (2006.01)
*G06F 21/72* (2013.01)

(52) U.S. Cl.
CPC ............ *H04L 9/0866* (2013.01); *G06F 21/72* (2013.01)

(58) Field of Classification Search
CPC ..... H04L 9/0866; H04L 9/3231; H04L 63/08; H04L 9/0897; H04L 2209/26; G06F 21/72; G06F 21/30; G06F 21/32; G06F 21/77; G06V 40/12; H04W 12/06
See application file for complete search history.

(56) References Cited

U.S. PATENT DOCUMENTS

2002/0095587 A1\* 7/2002 Doyle .................. G06Q 20/321
713/186
2006/0072748 A1 4/2006 Buer
(Continued)

FOREIGN PATENT DOCUMENTS

CN 109188246 A 1/2019
CN 110020558 A 7/2019
(Continued)

OTHER PUBLICATIONS

Supplementary European Search Report dated Jul. 19, 2022 for EP Application No. 20862608.5, 7 pages.
(Continued)

*Primary Examiner* — Abdulkader M Alriyashi
(74) *Attorney, Agent, or Firm* — Westman, Champlin & Koehler, P.A.

(57) ABSTRACT

A biometric device comprising: biometric sensing circuitry; cryptographic circuitry; a device key area in the biometric device for storing a cryptographic device key unique to the biometric device; and a test key area in the biometric device, for storing a cryptographic test key. The biometric device is controllable between: a test state in which the test key area is connected to the cryptographic circuitry to provide the test key to the cryptographic circuitry, and the cryptographic circuitry is prevented from performing cryptographic operations on data provided by the biometric sensing circuitry; and a functional state in which the device key area is connected to the cryptographic circuitry to provide the device key to the cryptographic circuitry, and the cryptographic circuitry is connected to the biometric sensing circuitry to receive and perform cryptographic operations on data from the biometric sensing circuitry using the device key.

15 Claims, 3 Drawing Sheets

(56) References Cited

U.S. PATENT DOCUMENTS

| | | |
|---|---|---|
| 2014/0189365 A1 | 7/2014 | Cox et al. |
| 2016/0028728 A1 | 1/2016 | Hampel et al. |
| 2017/0295026 A1* | 10/2017 | Guilley ................ G06F 11/263 |
| 2019/0026534 A1 | 1/2019 | Lin et al. |

FOREIGN PATENT DOCUMENTS

| | | |
|---|---|---|
| EP | 1499906 A1 | 1/2005 |
| WO | 2018164630 A1 | 9/2018 |

OTHER PUBLICATIONS

Hély, D. et al., "Securing Scan Control in Crypto Chips," J Electron Test, 2007, vol. 23, pp. 457-464.

Lee, J. et al., "A Low-Cost Solution for Protecting IPs Against Scan-Based Side-Channel Attacks," Proceedings of the 24th IEEE VLSI Test Symposium (VTS'06), 2006, 6 pages.

Li, X. et al., "Scan Chain Based Attacks and Countermeasures: A Survey," IEEE Access, vol. 7, Jun. 2019, pp. 85055-85065.

PCT International Search Report and Written Opinion dated Sep. 28, 2020 for International Application No. PCT/SE2020/050838, 14 pages.

Talatule, S.D. et al., "A Secure Architecture for the Design for Testability Structures," IEEE 2015, 6 pages.

Wang, W. et al., "A Secure DFT Architecure Protecting Crypto Chips Against Scan-Based Attacks," IEEE Access, vol. 7, Feb. 2019, pp. 22206-22213.

Yang, B. et al., "Secure Scan: A Design-for-Test Architecture for Crypto Chips," Proceedings of the 42nd Design Automation Conference, 2005, Anaheim, CA, pp. 135-140.

* cited by examiner

BIOMETRIC DEVICE WITH CRYPTOGRAPHIC CIRCUITRY

CROSS-REFERENCE TO RELATED APPLICATIONS

This application is a 371 U.S. National Stage of International Application No. PCT/SE2020/050838, filed Sep. 4, 2020, which claims priority to Swedish Patent Application No. 1951031-2, filed Sep. 12, 2019. The disclosures of each of the above applications are incorporated herein by reference in their entirety.

FIELD OF THE INVENTION

The present invention relates to a biometric device with cryptographic circuitry.

BACKGROUND OF THE INVENTION

Biometric devices are widely used as means for increasing the convenience and security of personal electronic devices, such as mobile phones etc.

For increased security, such as may be particularly beneficial for facilitating financial transactions etc., it would be desirable to provide cryptographic functionality, for instance preventing access to unencrypted biometric information of a user. In existing biometric systems with cryptographic functionality, there is, however a difficult tradeoff between a high level of security and ease of implementation and/or debugging.

SUMMARY

It is an object of the present invention to provide improved cryptographic functionality for an electronic device, such as a smart card or a communication device, comprising a biometric device, in particular a more secure cryptographic functionality and/or a cryptographic functionality that is easier and less time-consuming to implement and/or debug while maintaining a high level of security.

According to the present invention, it is therefore provided a biometric device, comprising biometric sensing circuitry for acquiring biometric information; cryptographic circuitry coupled to the biometric sensing circuitry for performing cryptographic operations on data provided by the biometric sensing circuitry; a device key area in the biometric device for storing a cryptographic device key unique to the biometric device; and a test key area in the biometric device, for storing a cryptographic test key, wherein the biometric device is controllable between: a test state in which the test key area is connected to the cryptographic circuitry to provide the test key to the cryptographic circuitry, and the cryptographic circuitry is disconnected from the biometric sensing circuitry so that the cryptographic circuitry is prevented from performing cryptographic operations on data provided by the biometric sensing circuitry; and a functional state in which the device key area is connected to the cryptographic circuitry to provide the device key to the cryptographic circuitry, and the cryptographic circuitry is connected to the biometric sensing circuitry to receive and perform cryptographic operations on data from the biometric sensing circuitry using the device key.

When integrating a biometric device with cryptographic capabilities in an electronic device, it is necessary to enable test and debugging of the cryptographic interaction between the processing circuitry of the electronic device and the biometric device.

In practice, this requires the use of a known cryptographic test key and known test data for test and debugging. It would also be desirable to allow a developer to toggle the biometric device between a test cryptographic mode and a functional cryptographic mode, to allow the developer to go back to testing of the cryptographic functionality after having performed other tests or measurements requiring the biometric device to be fully functional. Such other tests or measurements may, for example, include power consumption measurements, timing analysis, software development or software debug, etc.

The present invention is based on the realization that these or similar requirements could make the biometric device vulnerable to attacks and that such attacks can be prevented by configuring the biometric device in such a way that the biometric device is controllable between a test state and a functional state, where the biometric device is prevented from carrying out cryptographic operations on biometric data in the test state.

This ensures that the electronic device cannot be released to consumers with the biometric device in the test state, and thereby reduces the possibility of a hacker being able to access cryptographically processed biometric data using a cryptographic test key.

According to various embodiments, the biometric device may be additionally be configured in such a way that the cryptographic device key cannot be accessed by the cryptographic circuitry when the biometric device is in the test state, and in such a way that the cryptographic test key cannot be accessed by the cryptographic circuitry when the biometric device is in the functional state.

Hereby, the cryptographic circuitry can be prevented from performing cryptographic operations using the device key in the test state, and prevented from performing cryptographic operations using the test key in the functional state, to even further increase the security of the biometric device.

For instance, these measures may assist in preventing an attacker from deducing the cryptographic device key using known test data, as well as preventing an attacker from decrypting cryptographically processed biometric data using the cryptographic test key.

According to further embodiments, the biometric device may be configured in such a way that the cryptographic circuitry is prevented from performing cryptographic operations on test data, when the biometric device is in the functional state. Advantageously, the cryptographic circuitry may be prevented from being connected to a test data source when the biometric device is in the functional state.

In embodiments, the biometric device may, in the test state, be controllable to bypass the cryptographic circuitry, to enable readout of the test data from the biometric device without cryptographic operations having been performed on the test data. This allows verification of the test data, which facilitates debugging of the cryptographic functionality of the electronic device in which the biometric device is integrated.

In various embodiments, the biometric device may advantageously comprise routing circuitry for realization of transitions of the biometric device from the test state to the functional state and from the functional state to the test state. The routing circuitry may advantageously comprise first switching circuitry and second switching circuitry, which are suitably configured.

The biometric device according to various embodiments of the present invention may, furthermore, advantageously be included in an electronic device, further comprising processing circuitry connected to the biometric device and configured to control operation of the biometric device. The electronic device may further comprise cryptographic circuitry configured to perform cryptographic operations on data provided by the biometric device.

In summary, the present invention thus relates to a biometric device comprising: biometric sensing circuitry; cryptographic circuitry; a device key area in the biometric device for storing a cryptographic device key unique to the biometric device; and a test key area in the biometric device, for storing a cryptographic test key. The biometric device is controllable between: a test state in which the test key area is connected to the cryptographic circuitry to provide the test key to the cryptographic circuitry, and the cryptographic circuitry is prevented from performing cryptographic operations on data provided by the biometric sensing circuitry; and a functional state in which the device key area is connected to the cryptographic circuitry to provide the device key to the cryptographic circuitry, and the cryptographic circuitry is connected to the biometric sensing circuitry to receive and perform cryptographic operations on data from the biometric sensing circuitry using the device key.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the biometric device according to the present invention are mainly described with reference to a biometric device comprising biometric sensing circuitry in the form of fingerprint sensing circuitry. The biometric device is also mainly described as being integrated in a smart card.

It should be noted that this description is not intended to limit the scope of protection as defined by the claims, and that the biometric sensing circuitry may just as well be provided in the form of sensing circuitry for sensing another biometric, such as a face, or an eye pattern, such as an iris pattern. Furthermore, it should be understood that the smart card described herein is only one example of an electronic device in which the biometric device according to embodiments of the present invention may be integrated. Other electronic devices that may benefit from integrating the biometric device according to various embodiments of the present invention include, for example, mobile communication devices, consumer electronics, access control devices, and vehicles, etc.

Figure 1A:
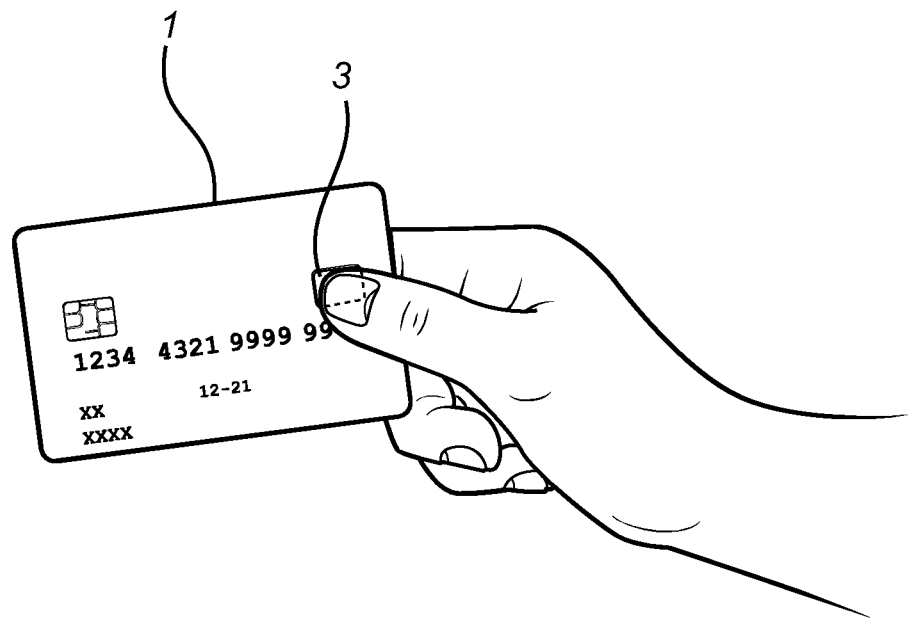
FIG. 1A is an illustration of an exemplary electronic device according to an embodiment of the present invention, in the form of a so-called contactless smart card.

FIG. 1A schematically illustrates a first example embodiment of an electronic device according to the present invention, in the form of a so-called contactless smart card 1 including a biometric device, in the form of biometric module 3. The biometric module 3 may be provided in the form of a single semiconductor chip, or as a multichip module. In the latter case, a fingerprint sensor chip may be provided on a first side of a carrier, and other circuitry needed for operation of the biometric module 3 may be provided as one or more semiconductor chips on the second side of the carrier, opposite the fingerprint sensor chip. Other configurations are possible and feasible.

Figure 1B:
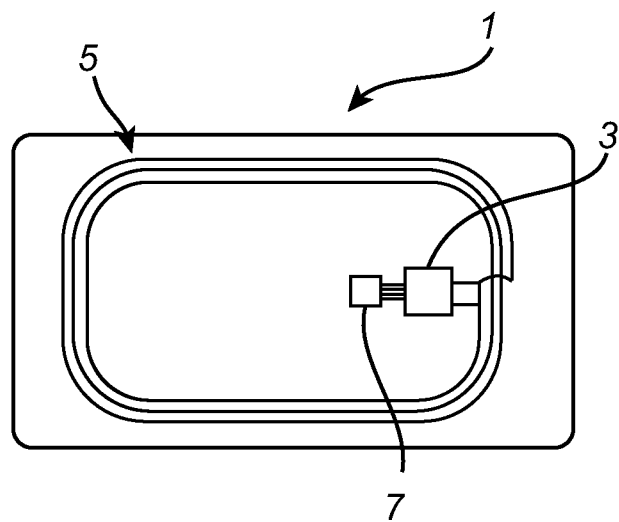
FIG. 1B is a schematic view of the smart card in FIG. 1a, when delaminated to reveal the functional parts of the smart card.

As is schematically shown in FIG. 1B, the smart card 1 additionally comprises an antenna 5, and a secure element 7. The antenna 5 is used for harvesting electrical power from a time-varying electrical field, and for wirelessly communicating with a remote device, such as a card reader (not shown), typically through load modulation. The secure element 7 may, for example, contain information for authorizing a transaction, and is connected to the biometric module 3. When the user is authenticated by the biometric module 3 (or by the biometric module 3 in co-operation with the secure element 7), the information contained in the secure element 7 may be unlocked and allowed to be wirelessly communicated to the card reader via the antenna 5. In embodiments, the secure element 7 may be integrated in the biometric module 3.

Figure 2:
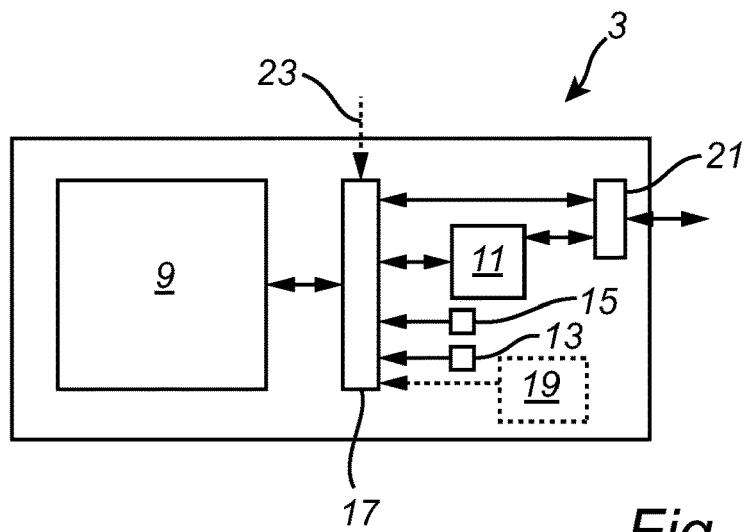
FIG. 2 is a schematic block diagram of a biometric device according to a first embodiment of the present invention.

FIG. 2 is a schematic block diagram of a biometric device 3 according to a first embodiment of the present invention. Referring to FIG. 2, the biometric device 3 comprises biometric sensing circuitry 9, cryptographic circuitry 11, a device key area 13, a test key area 15, routing circuitry 17, an optional test pattern generator 19, and a communication and control interface 21 for the biometric device 3.

As is schematically indicated in FIG. 2, the biometric sensing device 9, the cryptographic circuitry 11, the device key area 13, the test key area 15, and the communication and control interface 21 are all connected to the routing circuitry 17. In embodiments where the biometric device 3 comprises an internal test pattern generator 19, this may also be connected to the routing circuitry 17.

In the embodiment of the biometric device 3 shown in FIG. 2, the biometric device 3 can be controlled to be in a test state or a functional state through control of the routing circuitry 17. Such control of the routing circuitry 17 may take place via the communication and control interface 21, or by means of an optional dedicated control input 23 indicated by the dashed arrow in FIG. 2.

In the following, the test state of the biometric device 3 in FIG. 2 will be described with reference to FIG. 3A, and the functional state will be described with reference to FIG. 3B.

Figure 3A:
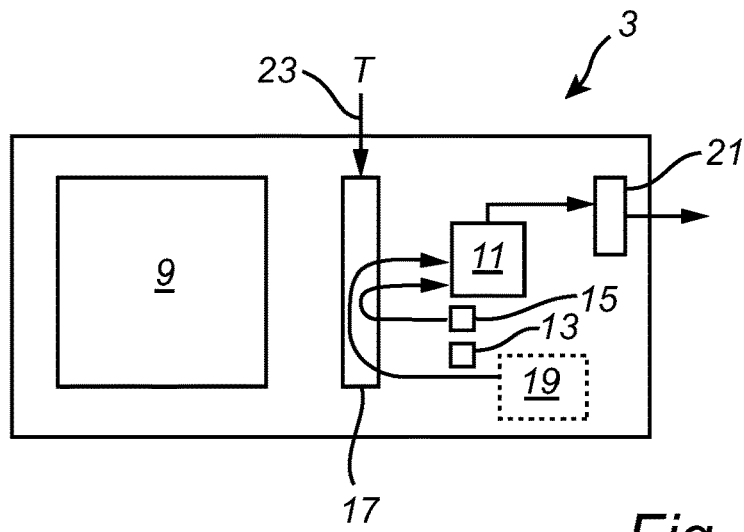
FIG. 3A schematically shows allowed signal paths in the test state.

Turning first to FIG. 3A, this figure schematically illustrates allowed signal paths for the biometric device 3 in the test state. As is indicated by the arrows in FIG. 3A, the routing circuitry 17 connects the test key area 15, the test pattern generator 19, and the communication and control interface 21 to the cryptographic circuitry 11. Through this configuration, the routing circuitry 17 allows input of the cryptographic test key and the test data to the cryptographic circuitry 11, and allows output from the biometric device 3 of cryptographically processed test data, via the communication and control interface 21.

When the biometric device 3 is in the test state as is indicated in FIG. 3A, the interaction with the cryptographic functionalities of the biometric device can conveniently be tested and debugged. The cryptographic test key in the test key area 15 is known to the developers (the test key may, for example, be the same for all biometric devices 3 in the same batch), and the test data generated by the test pattern generator 19 may be a known fixed pattern, such as a ramp or a Fibonacci sequence. It should be noted that a memory holding known test data may replace or complement the test pattern generator 19 described herein.

It should be noted that, when the biometric device 3 is in its test state, other signal paths than those indicated in FIG. 3A may be prevented. In particular, biometric data from the biometric sensing circuitry 9 cannot reach the cryptographic circuitry 11, and the cryptographic device key (which is unique to the individual biometric device 3) cannot be provided from the device key area 13 to the cryptographic circuitry 11. Hereby, it is ensured that the device key cannot be accessed or deduced by setting the biometric device 3 in the test state. Furthermore, it is ensured that the electronic device 1 in which the biometric device 3 is integrated is not—intentionally or by mistake—released to consumers with the biometric device using the test key for cryptographic operations on biometric data.

In the example configuration of FIG. 3A, the routing circuitry 17 has been controlled by a control signal value T on the control input 23, and test data is provided by the internal test pattern generator 19. It should be noted that this is one example configuration only, and that the control signal to the routing circuitry 17 and/or the test data may alternatively be provided from outside the biometric device 3, for example via the communication and control interface 21.

Figure 3B:
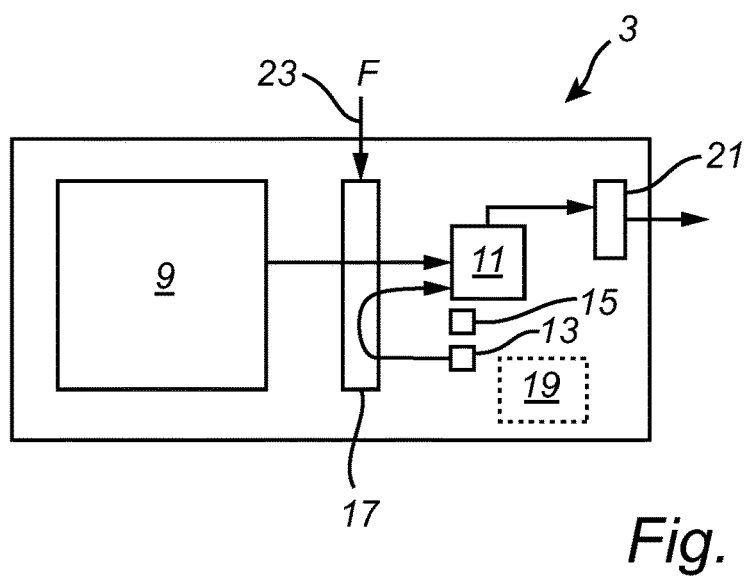
FIG. 3B schematically shows allowed signal paths in the functional state.

Referring now to FIG. 3B, this figure schematically illustrates allowed signal paths for the biometric device 3 in the functional state. As is indicated by the arrows in FIG. 3B, the routing circuitry 17 connects the device key area 13, the biometric sensing circuitry 9, and the communication and control interface 21 to the cryptographic circuitry 11. Through this configuration, the routing circuitry 17 allows input of the cryptographic device key, and biometric data from the biometric sensing circuitry 9 to the cryptographic circuitry 11, and allows output from the biometric device 3 of cryptographically processed biometric data, via the communication and control interface 21.

When the biometric device 3 is in the functional state as is indicated in FIG. 3B, the cryptographic circuitry 11 is operational to perform cryptographic operations on the biometric data from the biometric sensing circuitry 9, using the cryptographic device key that is unique to the individual biometric sensing circuitry 3. For instance, the cryptographic circuitry 11 may encrypt biometric data, such as a fingerprint representation before allowing external access to the biometric data via the communication and command interface 21.

When the biometric device 3 is in its functional state, other signal paths than those indicated in FIG. 3B may be prevented. In particular, the cryptographic circuitry 11 cannot perform cryptographic operations on the biometric data from the biometric sensing circuitry 9 using the cryptographic test key, and the cryptographic circuitry cannot perform cryptographic operations on the known test data from the test pattern generator 19 using the cryptographic device key.

In the example configuration of FIG. 3B, the routing circuitry 17 has been controlled by a control signal value 'F' on the control input 23. It should be noted that this is one example configuration only, and that the control signal to the routing circuitry 17 may alternatively be provided from outside the biometric device 3, for example via the communication and control interface 21.

Figure 4:
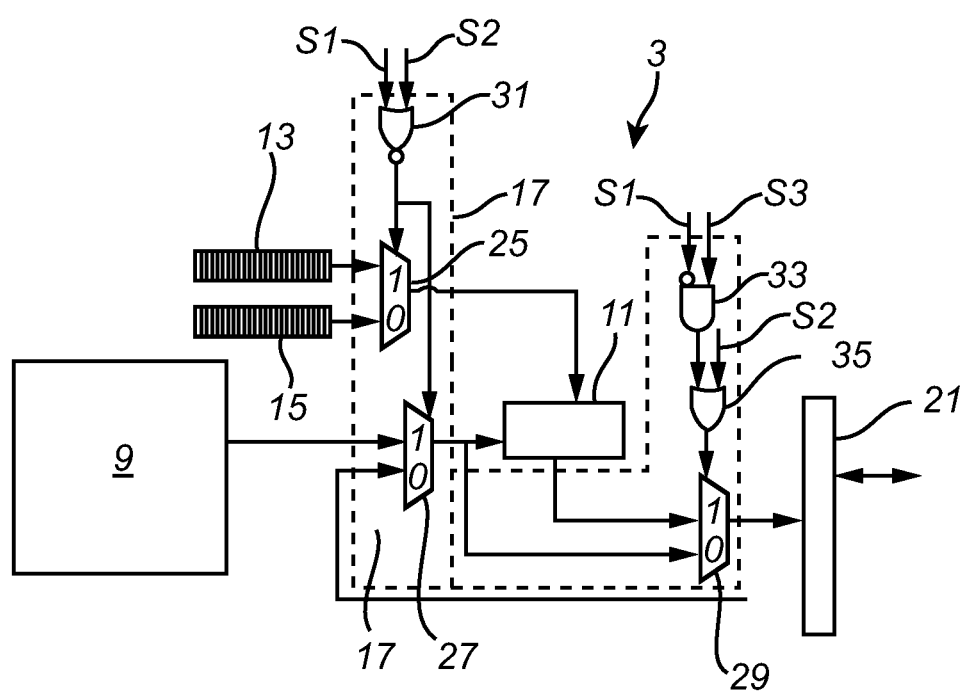
FIG. 4 is a schematic block diagram of a biometric device according to a second embodiment of the present invention.

A biometric device according to a second example embodiment of the present invention will now be described with reference to FIG. 4. As is schematically indicated in FIG. 4, the routing circuitry 17 comprises first switching circuitry 25, here in the form of a first multiplexer, second switching circuitry 27, here in the form of a second multiplexer, and third switching circuitry 29, here in the form of a third multiplexer. The routing circuitry 17 further comprises control circuitry to implement routing rules for the routing circuitry. In this particular example, the control circuitry is embodied by first 31, second 33 and third 35 logic gates. The first switching circuitry 25 is controllable to selectively connect the device key area 13 or the test key area 15 to the cryptographic circuitry 11, the second switching circuitry 27 is controllable to selectively connect the biometric sensing circuitry 9 or a test data source (not shown in FIG. 4), in this case via the communication and control interface 21, to the cryptographic circuitry 11, and the third switching circuitry 29 is controllable to selectively connect an output of the second switching circuitry or an output of the cryptographic circuitry 11 to the communication and control interface 21.

As can be seen in FIG. 4, the first switching circuitry 25 and the second switching circuitry 27 are controlled by a common control signal output by the first logic gate 31, in such a way that a first value of the common control signal causes the first switching circuitry 25 to connect the test key area 15 to the cryptographic circuitry 11 and the second switching circuitry 27 to connect the external test data source via the communication and control interface 21 to the cryptographic circuitry 11, and a second value of the common control signal causes the first switching circuitry 25 to connect the device key area 13 to the cryptographic circuitry 11 and the second switching circuitry 27 to connect the biometric sensing circuitry 9 to the cryptographic circuitry 11.

In this example embodiment, the first logic gate 31 is configured to receive a 'non-secured test mode' control signal S1, and a 'security test mode' control signal S2. The second logic gate 33 is configured to receive the 'non-secured test mode' control signal S1, and a 'security mode locked' control signal S3. The third logic gate 35 is configured to receive an output from the second logic gate 33, and the 'security test mode' control signal S2.

The 'security mode locked' control signal S3 is irreversible, which can be achieved in various ways known to one of ordinary skill in the art, to prevent bypass of the cryptographic circuitry 11 when the biometric device 3 is in the functional state.

Through the configuration of the control circuitry in FIG. 4, the third switching circuitry 29 cannot be switched to allow output of biometric information that has not been cryptographically processed, once the 'security mode locked' control signal S3 has been set high. However, the switching circuitry 29 can be switched to allow output of test data that has not been cryptographically processed, once the 'security mode locked' control signal S3 has been set high, by appropriate values of the 'non-secured test mode' control signal S1 and the 'security test mode' control signal S2.

It should be noted that the configuration of the control circuitry in FIG. 4 is only an illustrative example, and that there are many ways in which one of ordinary skill in the art can implement the same or similar functionality.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A biometric device, comprising:
   biometric sensing circuitry for acquiring biometric information;
   cryptographic circuitry coupled to the biometric sensing circuitry for performing cryptographic operations on data provided by the biometric sensing circuitry;
   a device key area in the biometric device for storing a cryptographic device key unique to the biometric device; and
   a test key area in the biometric device, for storing a cryptographic test key,
   wherein the biometric device is controllable between:
      a test state in which the test key area is connected to the cryptographic circuitry to provide the test key to the cryptographic circuitry, and the cryptographic circuitry is disconnected from the biometric sensing circuitry so that the cryptographic circuitry is prevented from performing cryptographic operations on data provided by the biometric sensing circuitry; and
      a functional state in which the device key area is connected to the cryptographic circuitry to provide the device key to the cryptographic circuitry, and the cryptographic circuitry is connected to the biometric sensing circuitry to receive and perform cryptographic operations on data from the biometric sensing circuitry using the device key.

2. The biometric device according to claim 1, wherein:
   in the test state, the device key area is disconnected from the cryptographic circuitry to prevent the cryptographic circuitry from performing cryptographic operations using the device key; and
   in the functional state, the test key area is disconnected from the cryptographic circuitry to prevent the cryptographic circuitry from performing cryptographic operations using the test key.

3. The biometric device according to claim 1, wherein:
   in the functional state, the cryptographic circuitry is prevented from performing cryptographic operations on test data; and
   in the test state, the cryptographic circuitry is configured to receive the test data and to perform cryptographic operations on the test data using the test key.

4. The biometric device according to claim 3, wherein:
   in the test state, the biometric device is controllable to bypass the cryptographic circuitry, to enable readout of the test data from the biometric device without cryptographic operations having been performed on the test data.

5. The biometric device according to claim 3, wherein:
   in the test state, the cryptographic circuitry is connectable to a test data source for receiving the test data; and
   in the functional state, the cryptographic circuitry is prevented from being connected to the test data source.

6. The biometric device according to claim 5, wherein the biometric device further comprises a test input for receiving the test data from the test data source.

7. The biometric device according to claim 5, wherein:
   in the test state, the cryptographic circuitry is connected to the test data source to allow the cryptographic circuitry to receive the test data and to perform cryptographic operations on the test data using the test key; and
   in the functional state, the cryptographic circuitry is disconnected from the test data source to prevent the cryptographic circuitry from receiving the test data and from performing cryptographic operations on the test data using the device key.

8. The biometric device according to claim 1, wherein:
   the biometric device comprises routing circuitry coupled to the biometric sensing circuitry, the cryptographic circuitry, the device key area, and the test key area; and
   the routing circuitry is controllable to transition the biometric device between the test state and the functional state.

9. The biometric device according to claim 8, wherein the routing circuitry comprises:
   first switching circuitry controllable to selectively connect the test key area or the device key area to the cryptographic circuitry; and
   second switching circuitry controllable to selectively connect the biometric sensing circuitry or a test data source to the cryptographic circuitry.

10. The biometric device according to claim 9, wherein the routing circuitry further comprises third switching circuitry controllable to selectively connect an output of the second switching circuitry or the cryptographic circuitry to an output of the biometric device.

11. The biometric device according to claim 10, wherein the routing circuitry further comprises control circuitry configured to prevent the third switching circuitry from being controlled to switch from connecting the cryptographic circuitry to the output of the biometric device to connecting the output of the second switching circuitry to the output of the biometric device when the biometric device is in the functional state.

12. The biometric device according to claim 9, wherein the first switching circuitry and the second switching circuitry are configured to be controlled by a common control signal in such a way that:
   a first value of the common control signal causes the first switching circuitry to connect the test key area to the cryptographic circuitry and the second switching circuitry to connect the test data source to the cryptographic circuitry, to allow the cryptographic circuitry to perform cryptographic operations on test data provided from the test data source using the test key; and
   a second value of the common control signal causes the first switching circuitry to connect the device key area to the cryptographic circuitry and the second switching circuitry to connect the biometric sensing circuitry to the cryptographic circuitry, to allow the cryptographic circuitry to perform cryptographic operations on data provided by the biometric sensing circuitry using the device key.

13. The biometric device according to claim 9, wherein the first switching circuitry is a first multiplexer, and the second switching circuitry is a second multiplexer.

14. The biometric device according to claim 1, wherein the biometric sensing circuitry comprises at least one of capacitive fingerprint sensing circuitry, optical fingerprint sensing circuitry, ultrasonic fingerprint sensing circuitry, optical iris sensing circuitry, and optical face feature sensing circuitry.

15. An electronic device comprising:
   the biometric device according to claim 1; and
   processing circuitry connected to the biometric device and configured to control operation of the biometric device.

* * * * *